May 12, 1931.  O. J. GROEHN  1,804,607
METHOD OF AND APPARATUS FOR MAKING AUTOMOBILE DOORS
Filed May 1, 1928   12 Sheets-Sheet 1
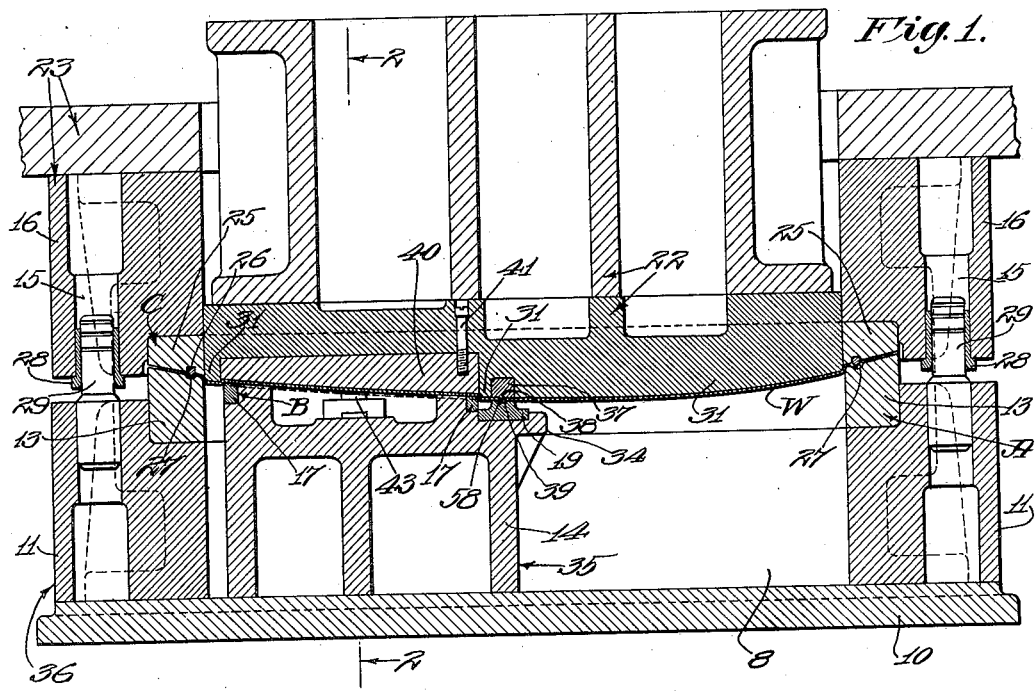
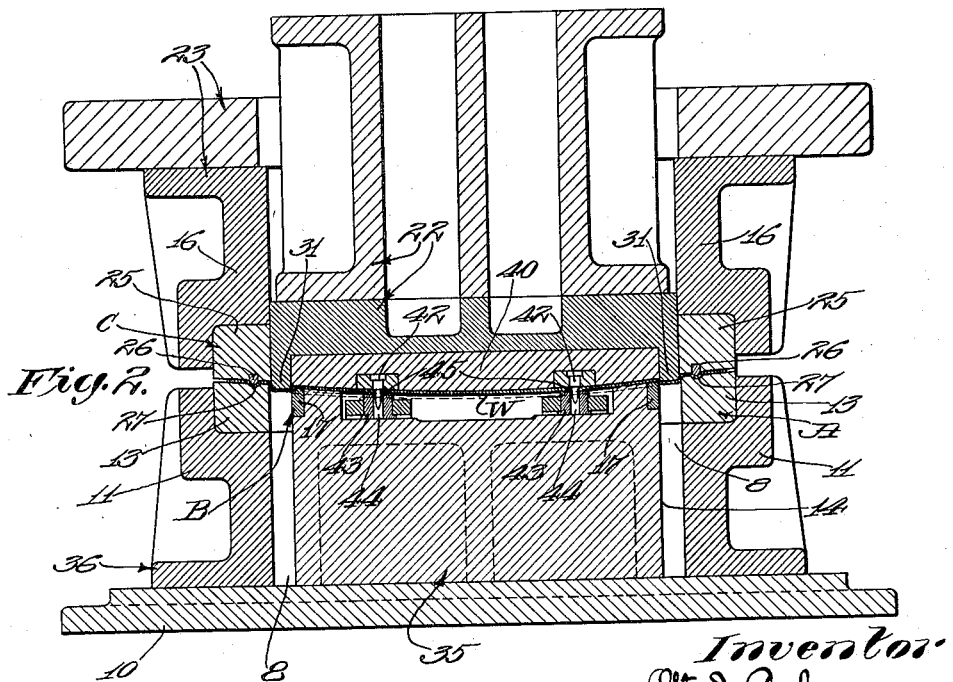

May 12, 1931.　　　　　O. J. GROEHN　　　　　1,804,607

METHOD OF AND APPARATUS FOR MAKING AUTOMOBILE DOORS

Filed May 1, 1928　　　12 Sheets-Sheet 2

Inventor:
Otto J. Groehn.
By Meachem, Calver, Copeland & Pike
Attorneys.

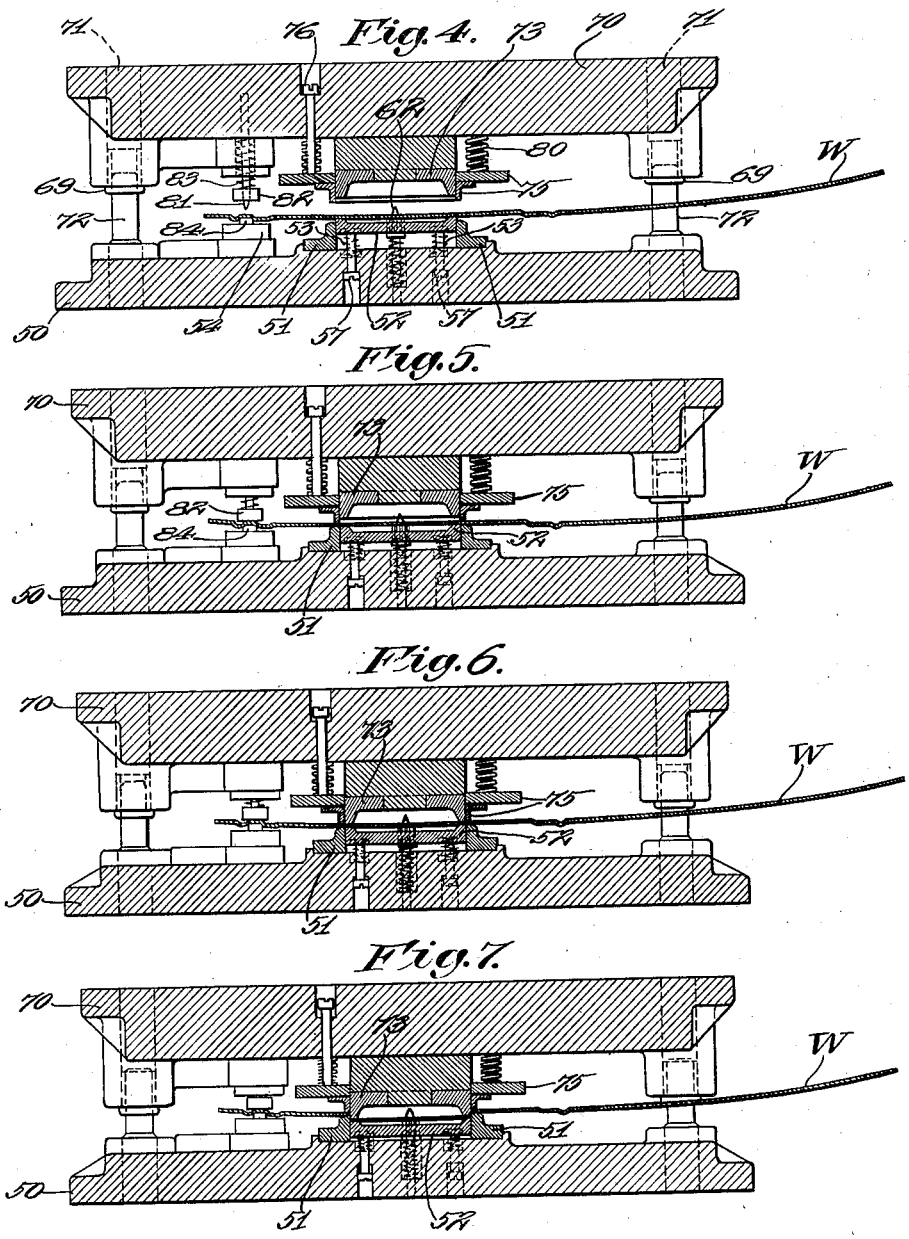

May 12, 1931. O. J. GROEHN 1,804,607
METHOD OF AND APPARATUS FOR MAKING AUTOMOBILE DOORS
Filed May 1, 1928 12 Sheets-Sheet 4
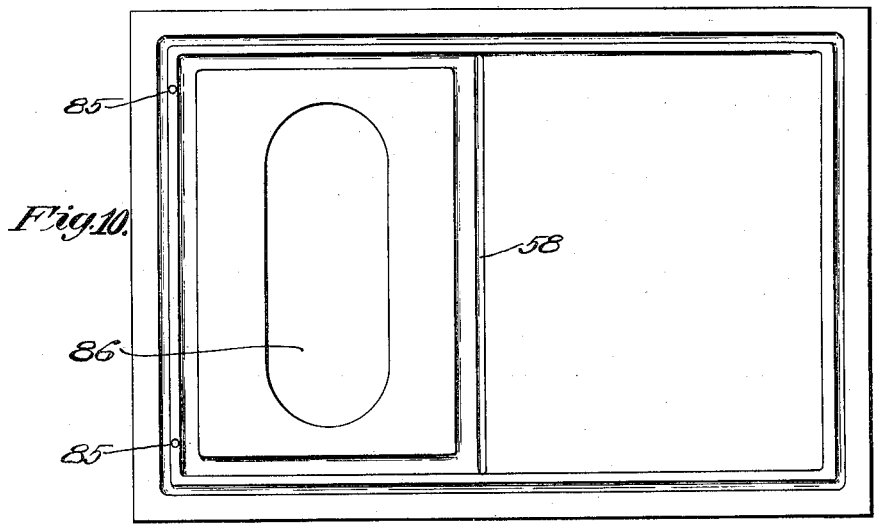
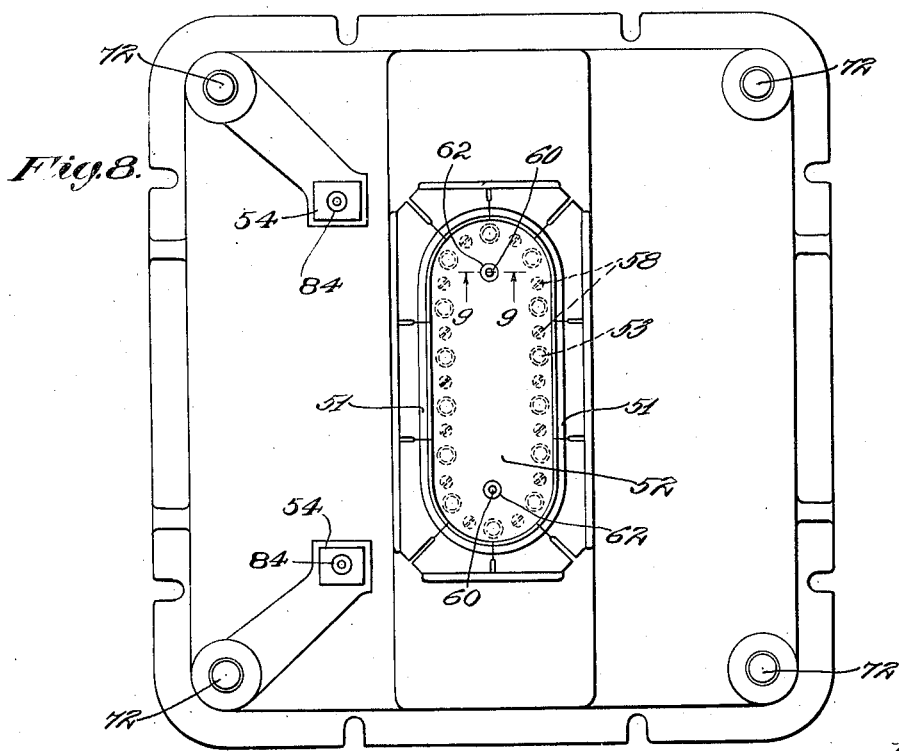

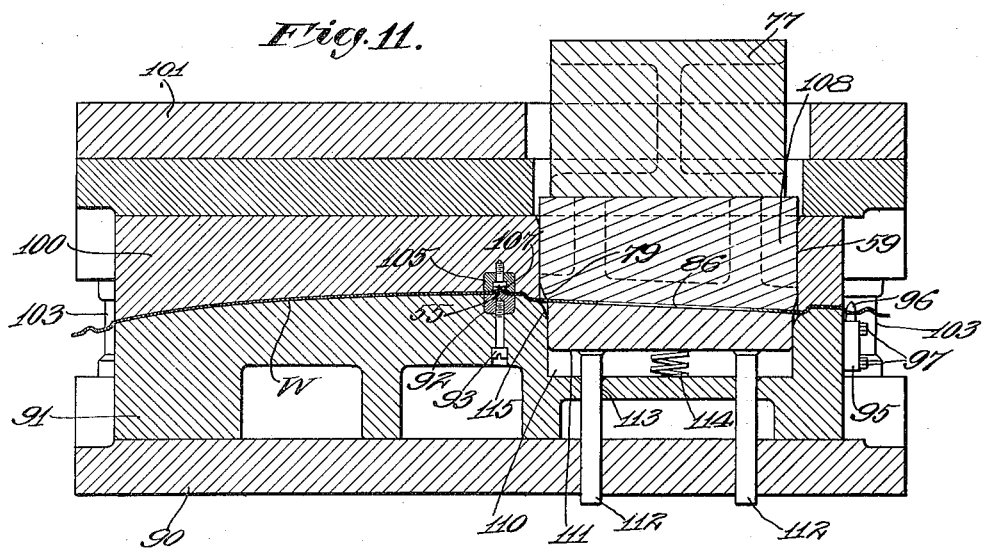

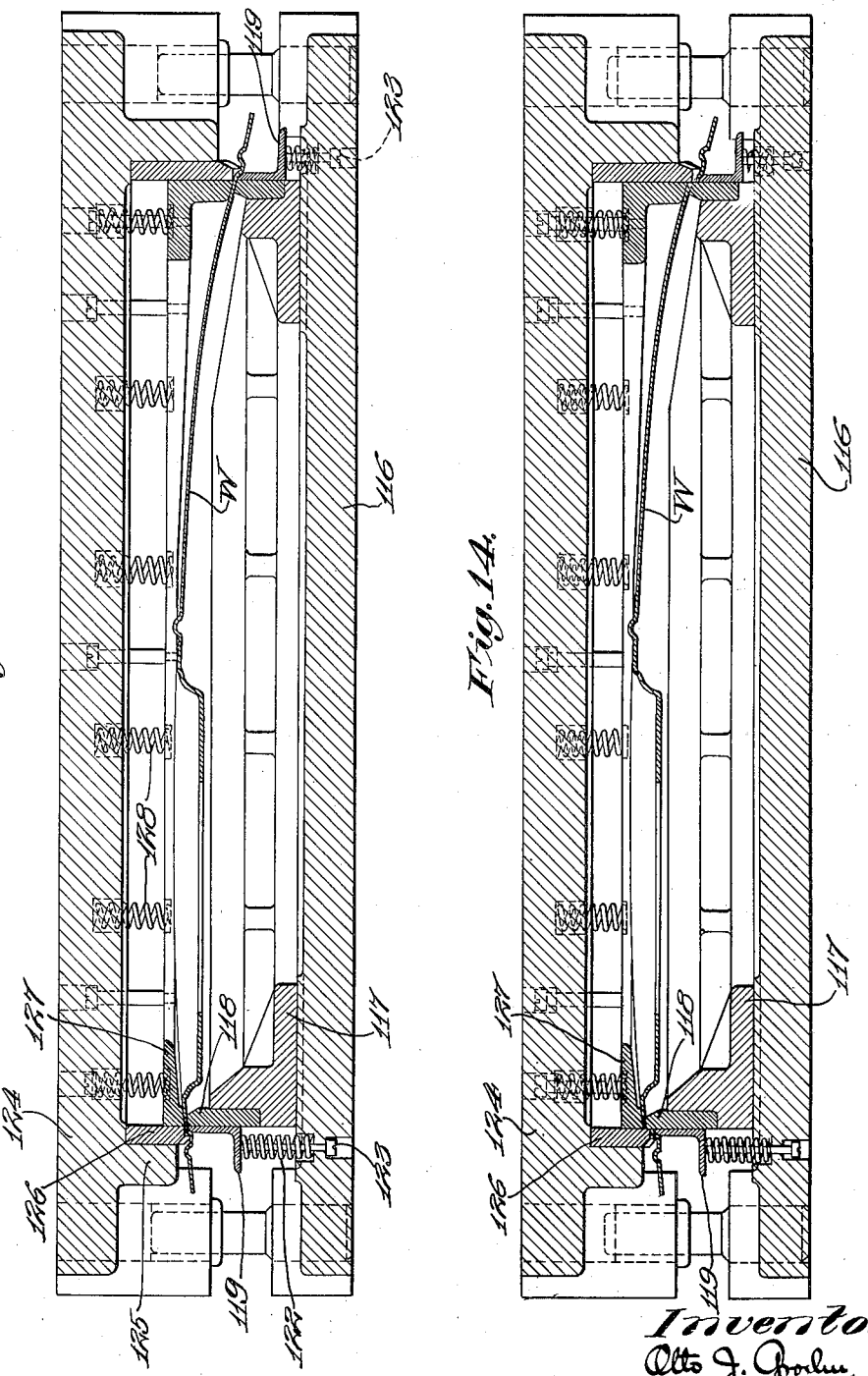

May 12, 1931.    O. J. GROEHN    1,804,607
METHOD OF AND APPARATUS FOR MAKING AUTOMOBILE DOORS
Filed May 1, 1928    12 Sheets-Sheet 7
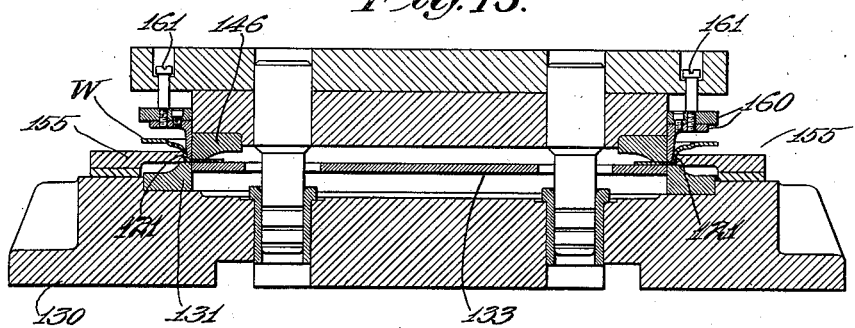
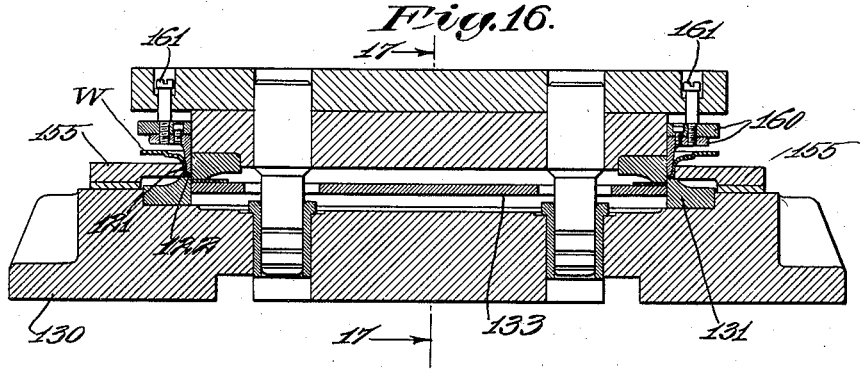
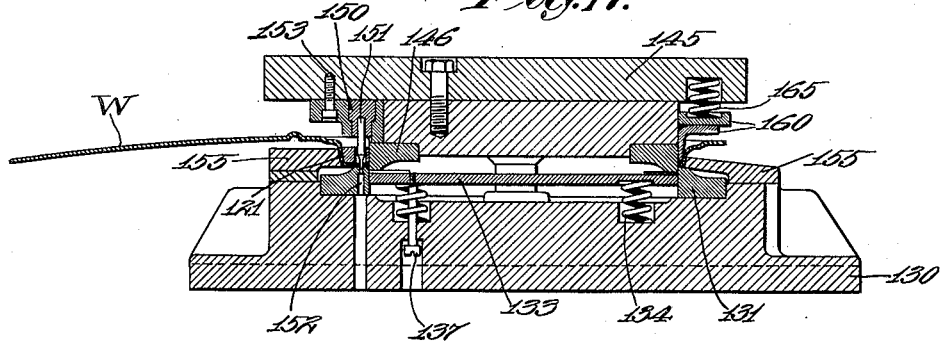

May 12, 1931.  O. J. GROEHN  1,804,607
METHOD OF AND APPARATUS FOR MAKING AUTOMOBILE DOORS
Filed May 1, 1928    12 Sheets-Sheet 8
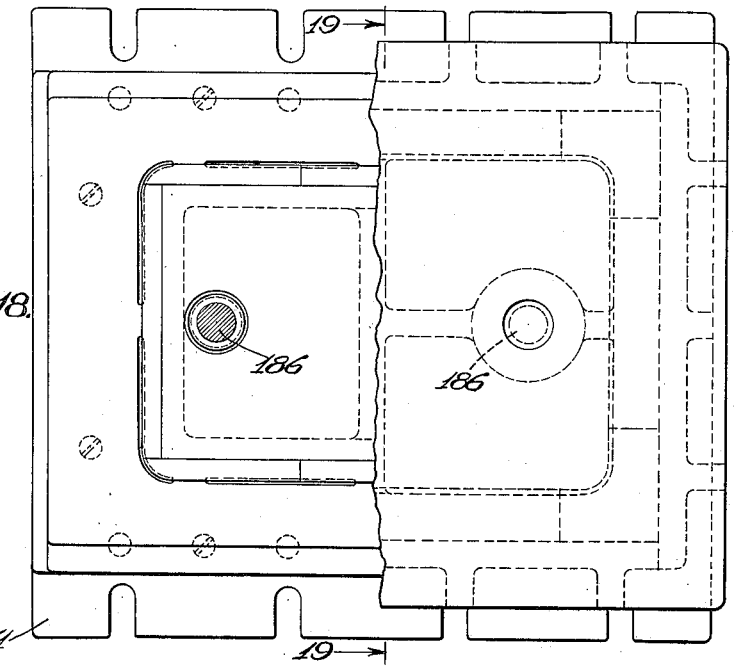
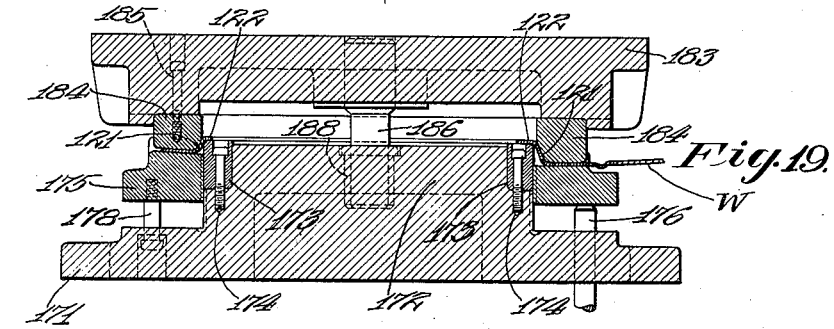
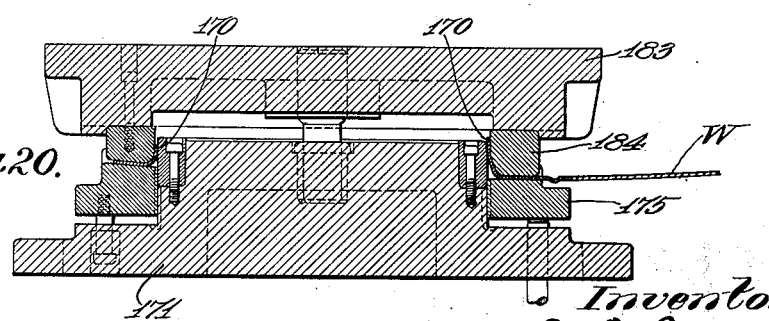

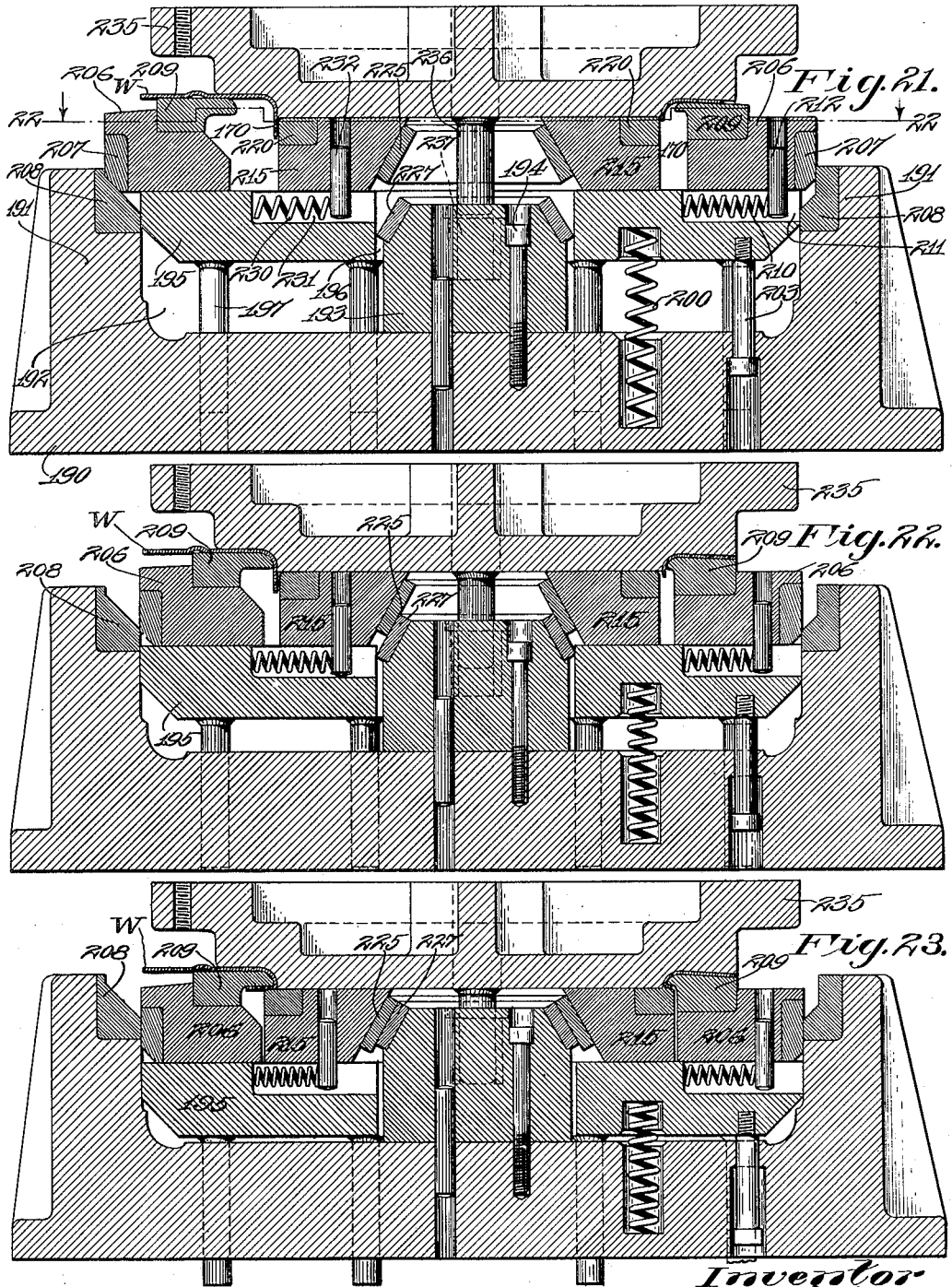

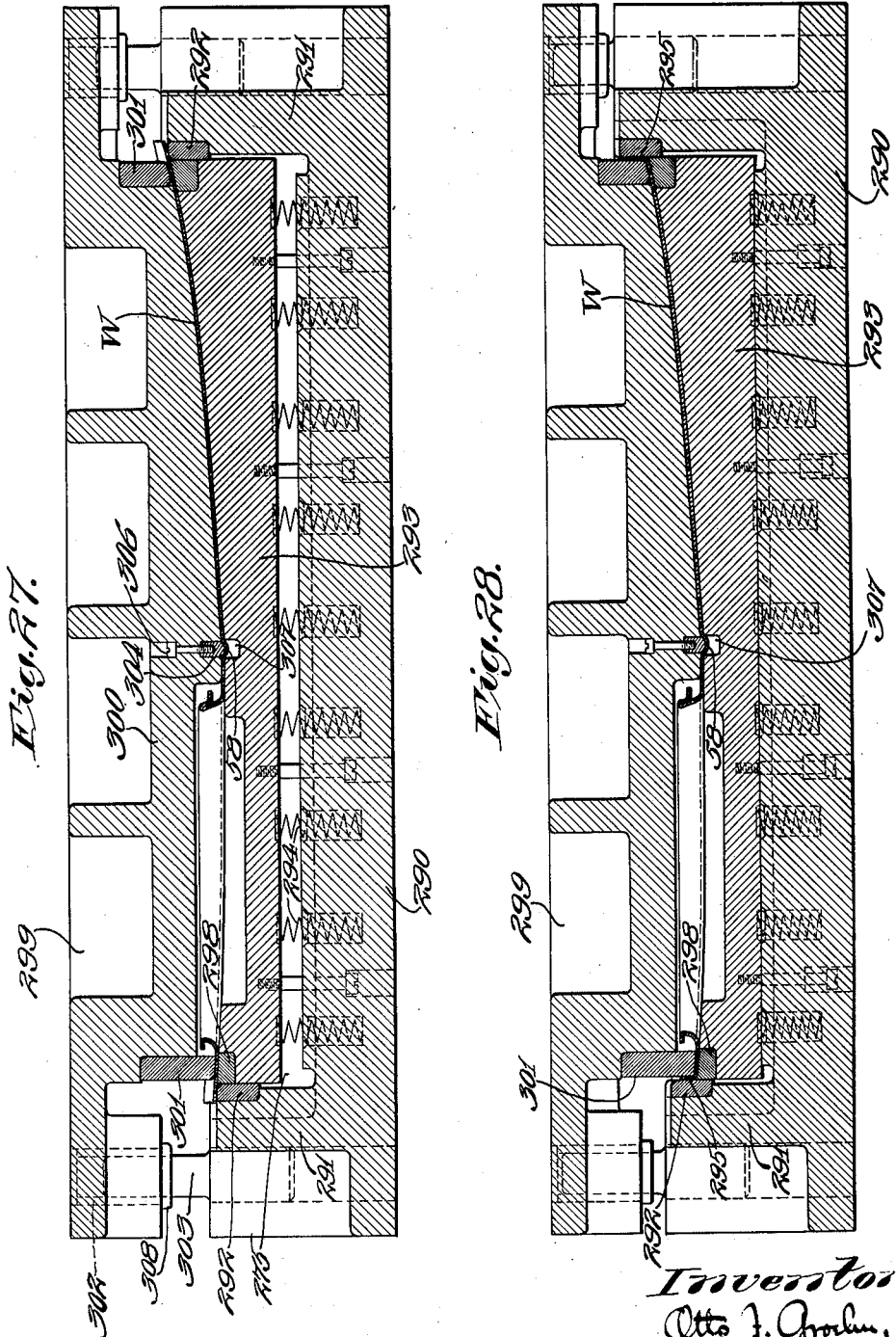

Patented May 12, 1931

1,804,607

UNITED STATES PATENT OFFICE

OTTO J. GROEHN, OF GROSSE POINTE PARK, MICHIGAN, ASSIGNOR TO HUDSON MOTOR CAR COMPANY, OF DETROIT, MICHIGAN, A CORPORATION OF MICHIGAN

METHOD OF AND APPARATUS FOR MAKING AUTOMOBILE DOORS

Application filed May 1, 1928. Serial No. 274,232.

This invention relates to a method of shaping sheet metal and more particularly to a method of making a door panel for metal automobile bodies of the general type disclosed in the application of M. H. Toncray, Serial No. 101,079, filed April 10, 1926. It is an object of the invention to provide a method whereby a blank of sheet material may be shaped to desired form readily and conveniently.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways.

Also it is to be understood that the phraseology or terminology employed herein is for the purpose of description and not of limitation, and it is not intended to limit the invention beyond the terms of the several claims hereto appended or the requirements of the prior art.

The invention will be more clearly understood from the following description in conjunction with the accompanying drawings, in which Fig. 1 is a vertical longitudinal section of a set of dies at the completion of the operation of shaping the blank to the general curvature of the door.

Fig. 2 is a vertical transverse section thereof taken on the line 2—2 of Fig. 1.

Figs. 4, 5, 6 and 7 are vertical longitudinal sections of a second set of dies illustrating successive positions thereof in making a preliminary or rough cut-out for the window opening of the panel.

Fig. 8 is a top plan view of the lower die thereof.

Fig. 10 is a plan view of the blank as shaped by the two sets of dies above referred to.

Figs. 11 and 12 are vertical longitudinal sections of a third set of dies illustrating successive positions thereof in drawing the window opening portion of the blank.

Figs. 13 and 14 are vertical longitudinal sections of a fourth set of dies illustrating successive positions thereof in trimming the outer edges of the door panel.

Figs. 15 and 16 are vertical transverse sections of a fifth set of dies illustrating successive positions thereof in trimming the edges of the window opening.

Fig. 17 is a vertical longitudinal section taken substantially on the line 17—17 of Fig. 16.

Fig. 18 is a plan view of a sixth set of dies, partially broken away, for straightening the window opening flange.

Figs. 19 and 20 are vertical longitudinal sections taken on the line 19—19 of Fig. 18, and illustrating successive positions of the sixth set of dies in straightening the window opening flange.

Figs. 21, 22 and 23 are vertical longitudinal sections of a seventh set of dies illustrating successive positions thereof in expanding and sizing a window opening.

Figs. 27 and 28 are vertical longitudinal sections of a ninth set of dies illustrating successive positions thereof in turning the outer edges of the door panel.

Figure 3:
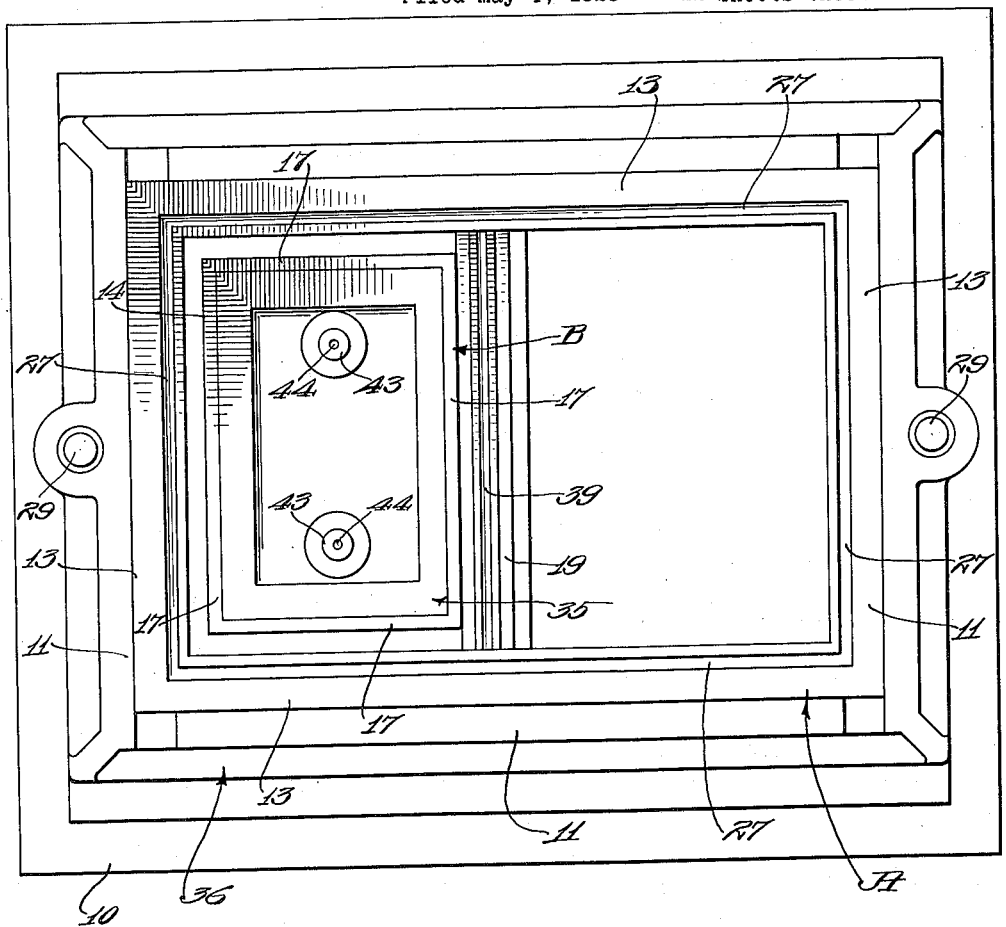
Fig. 3 is a top plan view of the lower die thereof.

In accordance with the invention, a blank of approximately the dimensions of the door panel is placed in a suitable machine for shaping it to the curvature of the door and performing certain other operations thereon which will be hereinafter described. A suitable machine for this purpose, see Figs. 1 to 3, comprises upper and lower dies. The lower die includes inner and outer die members 35 and 36, respectively. The base 10 has upwardly extending projections 11 at the edges thereof, said projections forming a recess 8 therebetween and constituting the lower outer die member 36. A hardened block A composed of side and end members 13 is secured in a recess formed in the upper surfaces of the projections 11 at their inner edges. Each of the members 13 is provided on its upper surface with a groove 27, said grooves forming a continuous channel in the block A.

The lower inner die member 35 comprises an upwardly extending part 14 to support the window opening portion of the blank and is positioned upon the base 10 in spaced relation to the projections 11 and extends upwardly in the recess 8.

A hardened block B composed of side and end members 17 is secured in a recess formed in the upper surface of the part 14 at the outer edges thereof. A hardened block 19 provided with a groove 39 in its upper surface is secured to a shelf 34 projecting from the inner side of the part 14 (Figs. 1 and 3). The part 14 has also secured to its upper surface two hardened blocks 43, each of which is provided with a hole 44 therein for a purpose to be hereinafter described.

The upper die comprises separate and relatively movable inner and outer die members 22 and 23, respectively. A hardened block C similar in general shape to the block A and composed of side and end members 25 is secured in a recess formed in the lower inner edges of projections 16 of the die member 23. The members 25 of the block C on the upper die member are suitably shaped to cooperate with the members 13 of the block A on the lower die member to hold the edges of the blank while certain operations are performed thereon. With this in view each member 25 is provided with a projection or hardened rib 26 which cooperates with the channel 27 in the block A to grip said blank. The upper outer die member 23 is also provided with openings 15 in which are secured bushings 28 adapted to receive for sliding engagement therewith guides 29 secured to the projection 11 of the lower outer die member. The lower surface of the upper inner die member 22 is suitably formed to cooperate with the lower die to shape blanks to the curvature of the door and for this purpose is provided with depending projections 31 adapted to draw the metal between the members 13 and 17. A hardened block 37 is mounted in the die member 22 and is provided with a rib 38 adapted to cooperate with the groove 39 in the block 19 to form a transverse rib 58 on the panel blank (as shown in Figs. 1 and 10). A member 40 of the approximate size and shape of the effective upper surface of the part 14 is secured above said member as by bolts 41, to the upper inner die member 22. The member 40 is provided on its lower surface with punches 42 which cooperate with the holes 44 in the blocks 43 mounted upon the part 14 to pierce positioning holes in the blank.

In operation the upper die members 22 and 23 are elevated and a suitable blank W is positioned on the lower outer die member 36. The upper outer die member 23 is then moved downwardly to cause the ribs 26 to press the edge portions of the blank into the grooves 27 of the block A to grip the same. The upper inner die member 22 is then moved downwardly to engage and shape the blank to the curvature of the door by drawing the blank over the inner lower die member 35 and between the inner and outer lower die member. During this movement of the inner die member 22, the punches 42 cooperating with the blocks 43 pierce the blank to form holes 45 which are used for positioning the blank in a machine for a subsequent shaping operation.

Figure 9:
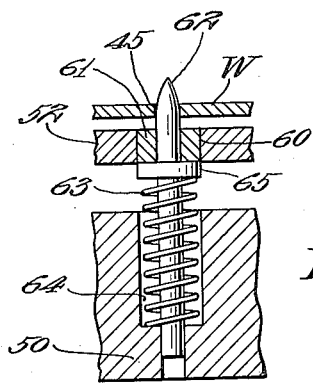
Fig. 9 is an enlarged section taken on the line 9—9 of Fig. 8.
Figure 24:
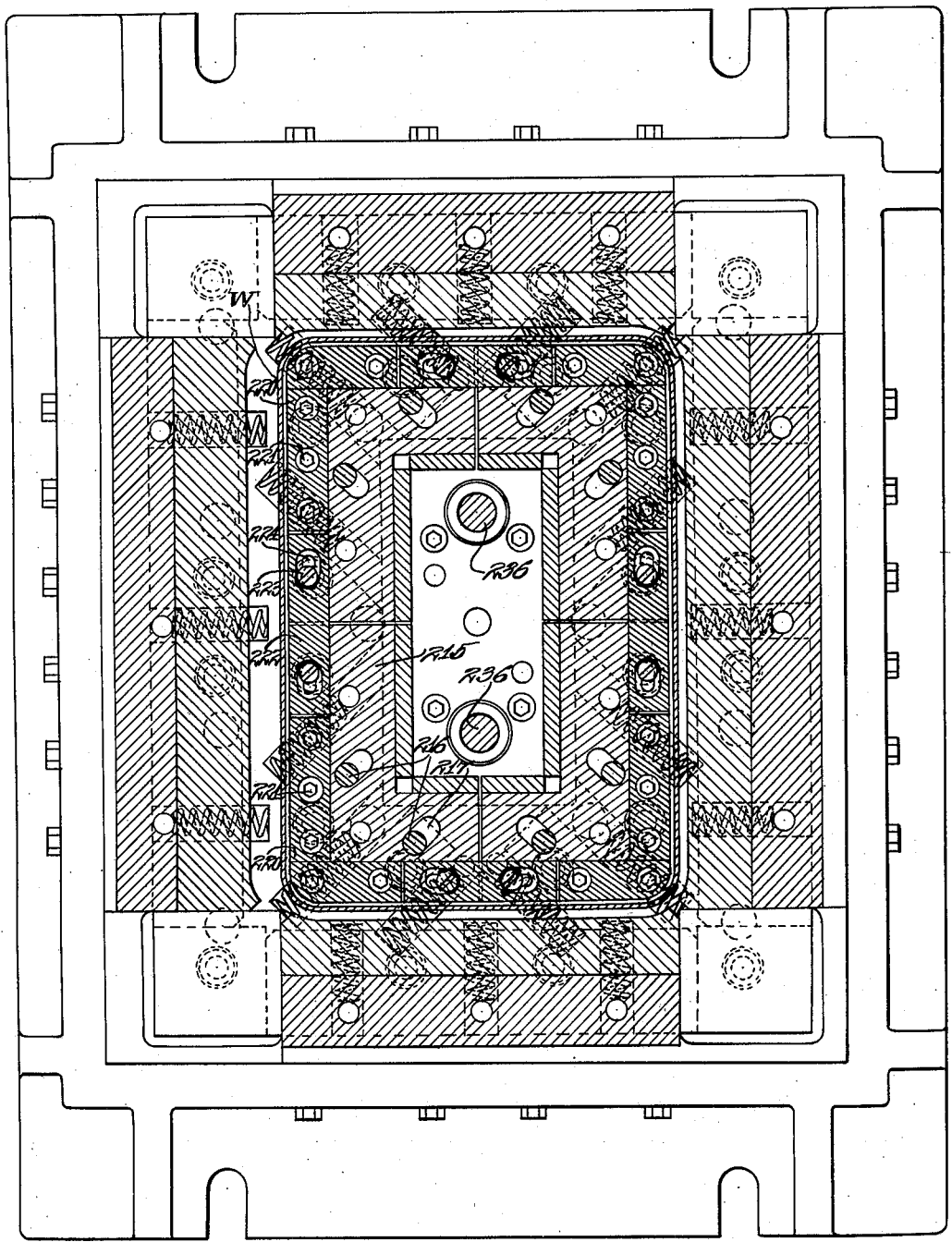
Fig. 24 is a horizontal section taken on the line 24—24 of Fig. 21.

The blank is then prepared for drawing a relatively large area including that portion in which the window opening subsequently is cut. To facilitate this operation, a preliminary opening is made in this portion of the blank. A suitable machine for performing this operation, see Figs. 4 to 9, comprises a base 50 carrying a lower die member 51, which may be oval shape as shown in Fig. 8, the inner surface of said die member constituting a cutting edge. A plate 52 is movably mounted and guided within the die member 51 and normally is held yieldingly in raised position therein by springs 53. The upward movement of the plate 52 is limited by bolts 57. The plate 52 is provided with holes 60, see Figs. 8 and 9, to receive bushings 61 in which a positioning pin 62 is movably mounted. The pin 62 normally is held in extended position by a spring 63 located in a depression 64 in the base and engaging the head 65 of the pin 62.

A reciprocable ram 70 is provided with guide openings 71 fitted with bushings 69 adapted to receive for sliding engagement therewith guides 72 secured in the base 50. The ram 70 has secured thereto an upper die member 73 of a shape similar to the lower die member 51 and of a size to fit within said die member 51 when the dies are in closed position. The outer surface of the upper die member 73 constitutes a cutting edge which cooperates with the cutting edge of the lower die member 51 to make the preliminary cut-out in the window opening portion of the blank.

A gripping member 75 of a shape similar to the die member 73 and surrounding said die member is movably mounted upon the ram. The outward movement of the member 75 is limited by bolts 76 secured thereto and slidably mounted in the ram. The member 75 is held normally in extended position by springs 80 extending between the ram and member 75. Punches 81 are mounted upon the ram, each punch being surrounded by an annular gripping member 82 which is normally held in extended position by a spring 83. The punches 81 and gripping member 82 are arranged to cooperate with a hollow block 84 mounted in a projection 54 to pierce positioning holes 85 in the blank, as shown in Fig. 10.

The blank which has been previously shaped to the desired curvature of the door is placed in the machine above referred to so as to rest upon the blocks 84 and the plate 52 with the positioning pins 62 passing through the holes 45 in the blank. The ram 70 is then moved downwardly to bring the gripping members 82 into engagement with the blank and press the same against the blocks 84 and upon further downward movement cause the punches 81 to pierce the blank. At the same time the yieldingly mounted gripping member 75 is brought into engagement with the blank to press the same against the top surface of the lower die member 51 and upon further downward movement of the ram, the upper die member 73 cooperates with the lower die member to make the cut-out in the window opening portion of the panel indicated at 86, in Fig. 10.

A relatively large area of the metal surrounding the cut-out portion of the blank is then drawn to provide a depression having sides forming the window opening flange. A suitable machine for this purpose, see Figs. 11 and 12, comprises a base 90 having a lower gripping member 91 adapted to receive the previously shaped blank and is provided with a hardened block 92 secured in transverse relation thereto by bolts 93. The block 92 is formed on its upper surface with a rib 55 adapted to receive the concave side of the rib 58 previously formed in the blank.

Supports 95 provided with positioning pins 96 are secured to the member 91 by bolts 97, said pins 96 projecting above the upper surface of the member 91 and being adapted to engage the positioning holes 85 previously formed in the blank. The member 91 is provided with a depression 110 corresponding in size and relative position to the window opening portion of the blank. Said depression is formed with a flaring portion 115 at its entrance and is adapted to receive a movable block 111 which is guided in its movement by the sides of the depression and by pins 112 slidably engaging openings 113 in the member 91 and is normally held yieldingly in raised position by springs 114. An upper gripping member 100 is secured to a reciprocable ram 101 which is provided with suitable openings to receive for sliding engagement therewith the guides 103 secured in the base 90. The member 100 is provided with a hardened block 105 secured in transverse relation thereto by bolts 106. The block 105 is formed on its lower surface with a depression 107 to engage the rib 58 previously formed in the blank. The member 100 is provided with an opening 59 adapted to receive for sliding engagement therewith an upper die member 108 which is secured to a reciprocable ram 77. Said member 108 is provided with a tapered lower portion indicated at 79.

The blank to be drawn is placed upon the member 91 with the pins 96 engaging the holes 85 in the blank and the rib 55 of the block 92 engaging the concave side of the rib 58 in the blank. The upper outer die member 100 is then lowered to grip the blank and hold it against the member 91. The upper inner die member 108 is then moved downwardly to engage a substantial area of the metal surrounding the previously punched opening 86 shown in Fig. 10, and draw the same to form a depression 120 having side walls 121.

The edges of the panel blank are then trimmed to the desired dimensions. A suitable apparatus for this purpose (Figs. 13 and 14) comprises a base 116 having secured thereto a support 117. A lower cutting die 118 is secured to the upper outer edge of the support 117. A stripper member 119 is slidably mounted for engagement with the sides of the cutting die 118 and is held normally in extended position by springs 122 extending between the stripper member and the base. The upward movement of the stripper member is limited by bolts 123 secured to the stripper member and slidably mounted in the base.

A reciprocable upper die member 124 is provided near its outer edges with depending projections 125 to the inner edges of which an upper cutting die 126 is secured. A gripping plate 127 is slidably mounted between and guided by the sides of the upper cutting die 126 and is held normally in extended position by springs 128 extending between said plate and the upper die member 124.

The panel blank is placed in the machine upon the stripper member 119 as shown in Fig. 13. The upper die member 124 is then moved downwardly to bring the plate 127 into engagement with the blank and hold the same against the top surface of the lower cutting die 118 and upon further downward movement the upper cutting die 126 is brought into cooperative relation with the lower cutting die 118 to trim the edge of the panel.

The drawn area within the depression 120 is then trimmed along a line spaced from the sides 121 of the depression to leave a portion 122 projecting therefrom. A suitable machine for this purpose, see Figs. 15–17, comprises a base 130 carrying a lower die member 131, the inner upper edge of which constitutes a cutting edge. A plate 133 is movably mounted and guided within the die member 131 and normally is held yieldingly in raised position therein by springs 134. The upward movement of the plate 133 is limited by bolts 137. An upper member 145 is suitably mounted for reciprocating movement toward and from the base and has secured thereto a die member 146 of a shape similar to the lower die member 131 and of a size to fit within said die member 131 when the dies are in closed position. The outer lower edge of the upper die member 146 constitutes a cutting edge which cooperates with the cutting edge of the lower die member 131 to trim the edges of the window opening. A gripping member 160 of a shape similar to the die member 146 and surrounding said die member is movably mounted on the member 145 by bolts 161 secured to the member 160 and slidably mounted in the member 145, said bolts also serving as stops to limit the outward movement of the member 160.

Blocks 150, each carrying a punch 151 adapted to cooperate with an opening 152 in the lower die member 131 to punch a hole in the lower flange of the window opening are secured to the member 145 by bolts 153. Positioning lugs 155 are mounted upon the base 130 to position the panel blank for the trimming operation. The gripping member 160 normally is held in extended position by springs 165 extending between said member and the member 145.

The blank to be trimmed is placed in the machine with the inner surface of the depressed portion of the blank resting upon the plate 133 and with the sides 121 of said depressed portion engaging the inner edges of the positioning lugs 155. The upper member 145 is then moved downwardly to bring the gripping member 160 against the blank and hold the same against the top surface of the lower die member 131. Further downward movement of the member 145 brings the upper die member 146 into cooperative relation with the lower die member 131 to cut and trim the window opening. At the same time the punches 151 cooperating with the openings 152 are caused to pass through the lower flange of the window opening portion of the blank and pierce openings therein through which screws or bolts are subsequently passed for securing other parts of the body to the panel.

In the next operation the projection 122 is straightened to form with the sides 121 of the depression 120 a window opening flange 170. A suitable machine for this purpose, see Figs. 18 to 20, comprises a base or support 171 having a central projection 172 forming a lower die member which is provided at each of its upper outer edges with a hardened block 173 secured thereto by bolts 174. The lower die member 172 is surrounded by a movable annular plate 175 having sliding engagement with the vertical sides of the said die member. The plate 175 is movably mounted on the base 171 by bolts 178 secured to said plate and slidably mounted in the base, said bolts also serving as stops to limit the outward movement of the plate 175.

The plate 175 normally is held in extended position by plungers 176 which may be yieldingly mounted in any suitable manner (not shown). An upper die member 183 is provided on its lower surface with a hardened block 184 which is secured thereto by bolts 185. Said block is provided with an opening 179 adapted to receive the lower die member 172. Guides 186 are mounted in the member 183 to project downwardly for sliding engagement with the bushings 188 in the lower die member 172.

The previously shaped blank is placed in the machine upon the plate 175 and with the projection 122 of the window opening portion resting upon the blocks 173. The upper die member 183 is then moved downwardly to bring the block 184 against the blank and hold the same against the plate 175. Upon further downward movement the projection 122 is drawn between the blocks 173 and 184 to straighten the projection 122 and form with the sides of the depression a window opening flange 170 as shown in Fig. 20.

The edge of the window opening is then expanded and sized and the flange 170 turned under in a suitable machine which may comprise (as shown in Figs. 21 to 24) a base 190 provided with projections 191 at its outer edges forming a depression 192. A block 193 projecting upwardly from the base and positioned in the central part of the depression is secured to the base by bolts 194. A suitable support 195 provided with an opening 196 to permit relative movement between the block 193 and said support is movably mounted in the depression 192 and is guided in its movement therein by posts 197 secured thereto and slidably mounted in the base. The support 195 is normally held in raised position by springs 200. The upward movement of the support 195 is limited by bolts 203 secured thereto and slidably mounted in the base.

Lower outer die members 206 are movably carried upon the support 195 and each is provided at its lower outer surface with a hardened block 207 adapted to engage a suitably shaped cam 208 positioned upon the inner upper surface of each of the projections 191. The inner upper surface of each die member 206 is provided with a hardened block 209 suitably shaped for engagement with the flange and body of the sheet metal panel. Each die member 206 is normally held in engagement with the cam 208 by springs 210 positioned in slots 211 in the support 195 with one end of each spring engaging said support at the end of the slot and the opposite end engaging a pin 212 secured in one of the die members 206 projecting downwardly within one of the slots 211.

An inner die member comprises corner portions 215 slidably mounted on the support 195 and guided by bolts 216, see Fig. 22, passing through elongated slots 217 therein and threaded in the support. The upper outer portion of each corner member 215 is provided with a hardened block 220 secured thereto by screws 221. Adjacent corner members are connected by a member 222 movable relative thereto and secured thereto by screws 223 passing through elongated slots 224 in the member 222 and engaging the corner members. The inner surface of each corner member 215 has secured thereto a hardened block 225 adapted for cooperative engagement with cams 227 secured to the upper corner portions of the block 193. The corner portions 215 of the lower inner die members normally are held in retracted position by springs 230 positioned with one end against the end of a slot 231 in the supports 195 and with the opposite end engaging a pin 232 secured in said corner portions and extending downwardly into the slots.

An upper die member 235 is suitably mounted upon a reciprocable ram (not shown) and is shaped to engage the lower outer die members 206 and is adapted to pass within the opening of the panel and engage the flange 170 thereof and the top surface of the lower inner die members. The upper die member 235 is suitably guided in its movement towards the lower die members by guides 236 secured thereto and adapted for slidable engagement in guideways 237 in the block 193.

The previously shaped blank is placed in the machine so as to rest on the blocks 209 of the outer lower die members 206 with the window opening flange 170 surrounding the inner die members 215. The upper die member 235 is then moved downwardly to engage the blank upon the outer lower die members and move the latter downwardly together with the support 195. During this downward movement the blocks 207 engage the cams 208 which direct the outer lower die members 206 inwardly along the top surface of the support 195 so as to bring the blocks 209 into engagement with the flange 190. At the same time the upper die member is positioned in the window opening to engage the opposite side of the flange and press the same against the blocks 209 of the outer lower die members. Upon further downward movement, the upper die member 235 engages the corner portions 215 of the lower inner die member causing the same to move downwardly together with the support 195 thereby bringing the blocks 225 into engagement with the cams 237 causing the corner portions of the lower inner die members to move outwardly toward the corner of the window opening and turn the depending portion of the flange 170 under the lower surface of the blocks 209 on the lower outer die members, as shown in Fig. 23.

A portion of the under-turned flange 170 is then offset to provide a support for the attachment of a weather strip. A suitable machine for performing this operation may comprise a base 240, Figs. 25 and 26, having spaced upwardly stepped projections 241 and 242. A gauge or guide 243 is secured at its lower end to the base and is provided at its upper free end with an inwardly extending portion 245. A stationary lower die member 246 is positioned upon the top surface of the projection 241 and is secured to the projections 242 by screws 248. A guide 250 is positioned upon the top surface of the base and is secured thereto by screws 251. A yieldingly movable lower die member 252 is positioned and guided between the stationary die member 246 and the guide 250 and is provided with a lateral projection 253 at its lower end which is held normally in a raised position against a shoulder 254 upon the stationary die member by springs 255 extending between the base and said die member. The die member 252 is provided at its upper end with an inwardly extending portion 260 overhanging and normally spaced from the stationary die member 246. Attached to each end of the die member 252 are supports 287 for the lower portion of the door panel. An upper die 261 is positioned appropriately upon a vertically reciprocable cam 262 and is secured thereto by screws 263. The adjacent surfaces of the die members 246, 252, and 261 are arranged substantially parallel.

Figure 25:
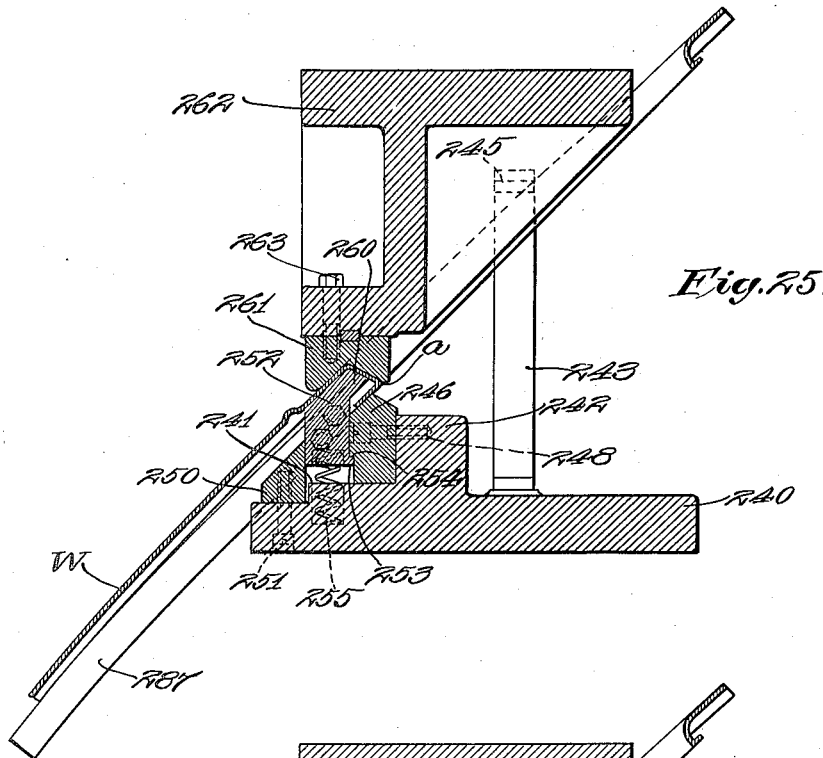
Figs. 25 and 26 are vertical longitudinal sections of an eighth set of dies illustrating successive positions thereof in offsetting the lower inturned flange of the window opening.
Figure 26:
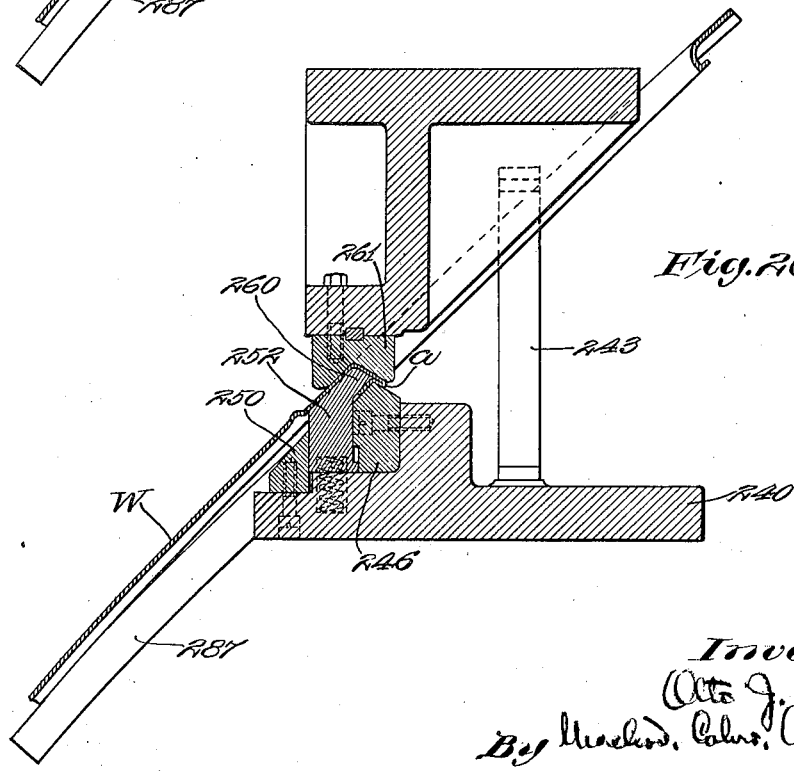

In operation the partially completed panel is positioned to rest upon the yieldingly mounted lower die member 252 and, preferably, at an inclination thereto (as shown in Fig. 25) with the portion 260 thereof within the underturned flange of said panel and with an upper portion of the panel engaging the inturned portion 245 of the guide 243 and the outer edges of the lower portion of the panel resting on the supports 287. With the panel thus positioned, the upper die is caused to move downward to bring the member 261 into engagement with the portion of the panel resting upon the yieldable member 252 and cause the latter to move downward and thereby bring the underturned flange into engagement with the top surface of the stationary lower die member 246. Further downward movement of the upper die and the lower die member 252 causes the stationary die member 246 to exert an upward pressure upon the underturned flange to bend the latter inwardly along the previously weakened line of fold indicated at $a$ and bend or crease it in the opposite direction along a line spaced from said weakened line of fold by jamming between the adjacent surfaces of the upper die, the yielding lower die and stationary lower die member. When the upper die is raised, the springs 255 move the die member 252 together with the door panel upward thereby permitting the removal of the panel from the machine.

In the next operation the edges of the panel are turned at substantially right angles so as to fit against the door pillars and the upper and lower cross members. A suitable machine for this purpose may comprise a base 290 (Figs. 27 and 28) having upwardly extending projections 291 forming a depression 275 therebetween. To the upper inner edges of the projections 291 hardened blocks 292 are secured. A yieldable stripper plate 293, the upper surface of which conforms substantially to the shape of the outer surface of the door panel, is mounted in the depression 275 between and guided by the sides of the blocks 292 and is held normally in extended position by springs 294 between said plate and the base 290. Hardened blocks 298 are secured to the upper outer edges of the plate 293. A reciprocable upper die member 299 is provided with a depending projection 300, the lower surface of which conforms substantially to the shape of the inner surface of the door panel. The lower outer edges of the projection 300 have secured thereto hardened blocks 301. The upper die member 299 is also provided with suitable openings 302 fitted with bushings 308 adapted to receive for sliding engagement therewith guides 303 which are mounted in the base. A ribbed block 304 is secured to the lower surface of the upper die member by bolts 306 and is adapted to engage the central rib 58 of the panel and hold the same in the groove 307 in the plate 293.

The panel blank is positioned in the machine upon the plate 293 with the rib 58 of the blank coinciding with the groove 307 of said plate. The upper die member is then moved downwardly to engage the blank and move the same downwardly together with the plate 293 whereupon the edges of the blank are drawn between the blocks 292 and 301 to form inturned flanges at substantially right angles to the body portion of the panel (as indicated at 295 in Fig. 28).

What I claim is:

1. In an apparatus for making metal automobile door panels, the combination of means for shaping a metal blank to the required curvature of the door, means for piercing a preliminary window opening, means for drawing the metal area around said opening to provide an offset area, and means for cutting a final window opening around said preliminary opening.

2. In an apparatus for making metal automobile door panels, the combination of means for shaping a metal blank to the required curvature of the door, means for piercing a preliminary window opening, means for drawing the metal area around said opening to provide an offset area, means for trimming the edges of the panel, means for cutting a final window opening within the offset area around said preliminary opening, and means for flanging the metal around said final window opening.

3. In an apparatus for making metal automobile door panels, the combination of means for shaping a metal blank to the required curvature of the door, means for piercing a preliminary window opening, means for drawing the metal area around said opening to provide an offset area, means for trimming the edges of the panel, and means for cutting a final window opening around said preliminary opening.

4. In an apparatus for making metal automobile door panels, the combination of means for shaping a metal blank to the required curvature of the door, means for piercing a preliminary window opening, means for drawing the metal area around said opening to provide an offset area, means for cutting a final window opening within the offset area around said preliminary opening, and means for flanging the metal around said final window opening.

5. The method of making metal automobile door panels which comprises shaping a blank of sheet metal to the desired curvature of the door, piercing the blank to provide an opening of substantial size, drawing the metal surrounding said opening to form a pan shaped depression, trimming said opening, and turning the outer edges of the blank to form a flange.

6. The method of making metal automobile body door panels which comprises shaping a sheet metal blank to the desired curvature of the door, cutting a preliminary window opening, drawing a relatively large area of the metal around said opening to form a depression in the blank having side walls, piercing the drawn area along a line spaced from said side walls leaving a flange projecting from said side walls, straightening said flange to form with said side walls a window opening flange, and turning the edges of said blank.

7. The method of making metal automobile body door panels which comprises shaping a sheet metal blank to the desired curvature of the door, piercing an opening of substantial size in the blank, drawing the metal surrounding said opening to form a depression having side walls, piercing the drawn area along a line spaced from said side walls leaving a flange projecting from said side walls, and straightening said flange to form with said side walls a window opening flange.

8. The method of making metal automobile body door panels which comprises shaping a blank to the desired curvature of the door, cutting a preliminary window opening, drawing a relatively large area of the metal around said opening to form a depression having side walls, piercing the drawn area along a line spaced from said side walls leaving a flange projecting from the side walls, straightening said flange to form with the side walls a window opening flange, sizing the window opening and turning the edge of the flange under, and offsetting a portion of the underturned flange.

9. The method of making metal automobile body door panels which comprises shaping a sheet metal blank to the curvature of the door, piercing the blank to form a preliminary opening, drawing the surplus metal to offset the window opening, trimming the outer edges of panel, trimming window opening, straightening flange of window opening, expanding window opening and turning flange under, folding underturned flange to form offset weather strip flange, and turning edges of panel to fit door pillar.

In testimony whereof I affix my signature.

OTTO J. GROEHN.